United States Patent [19]

Quinn et al.

[11] 4,156,649

[45] May 29, 1979

[54] DEWATERING ORE CONCENTRATES WITH BRANCHED ALKYL ETHOXYLATED ALCOHOL

[75] Inventors: John E. Quinn; Lawrence S. Wittenbrook, both of Doylestown, Pa.; Charles E. Donegan, Tucson, Ariz.

[73] Assignee: Betz Laboratories, Inc., Trevose, Pa.

[21] Appl. No.: 880,267

[22] Filed: Feb. 22, 1978

Related U.S. Application Data

[62] Division of Ser. No. 813,573, Jul. 7, 1977.

[51] Int. Cl.$^2$ ............................................. C02B 1/20
[52] U.S. Cl. ...................................... 210/51; 210/54; 210/70; 75/2; 252/60; 252/194
[58] Field of Search .................. 210/43, 51, 52, 53, 210/54 A, 54 R, 59, 61, 70, 54 C, 55, 42 R; 75/2; 252/60, 61, 351, 353, 532, 538, 551, 557, 194; 209/2, 166, 167

[56] References Cited

U.S. PATENT DOCUMENTS

| | | | |
|---|---|---|---|
| 2,266,954 | 12/1941 | Bonnet | 210/52 |
| 2,719,118 | 9/1955 | Bernard | 210/43 |
| 2,864,765 | 12/1958 | Stoneman | 210/70 |
| 2,975,123 | 5/1961 | Head | 210/43 |
| 3,359,330 | 12/1967 | Glickman | 252/194 |
| 3,865,718 | 2/1975 | Tveter | 209/166 |
| 4,097,390 | 6/1978 | Wang | 252/60 |

OTHER PUBLICATIONS

Surface Active Agents, Schwartz-Perry 1949, Interscience Publishers, N.Y., 489-494.
Hackh's Chemical Dictionary, Fourth Edition, McGraw-Hill, Inc., New York, 1972, p. 697.

Primary Examiner—Charles N. Hart
Assistant Examiner—Ernest G. Therkorn
Attorney, Agent, or Firm—Alexander D. Ricci; Steven H. Markowitz

[57] ABSTRACT

The present invention relates to the drainage or dewatering of ore concentrates and more particularly to an improved method for dewatering as by filtration, to produce solids which have a desirably low moisture content and which are readily and easily handled by conventional methods of materials handling. The method employs the use of linear or branched alkyl ethoxylated alcohols as dewatering aids.

34 Claims, 2 Drawing Figures

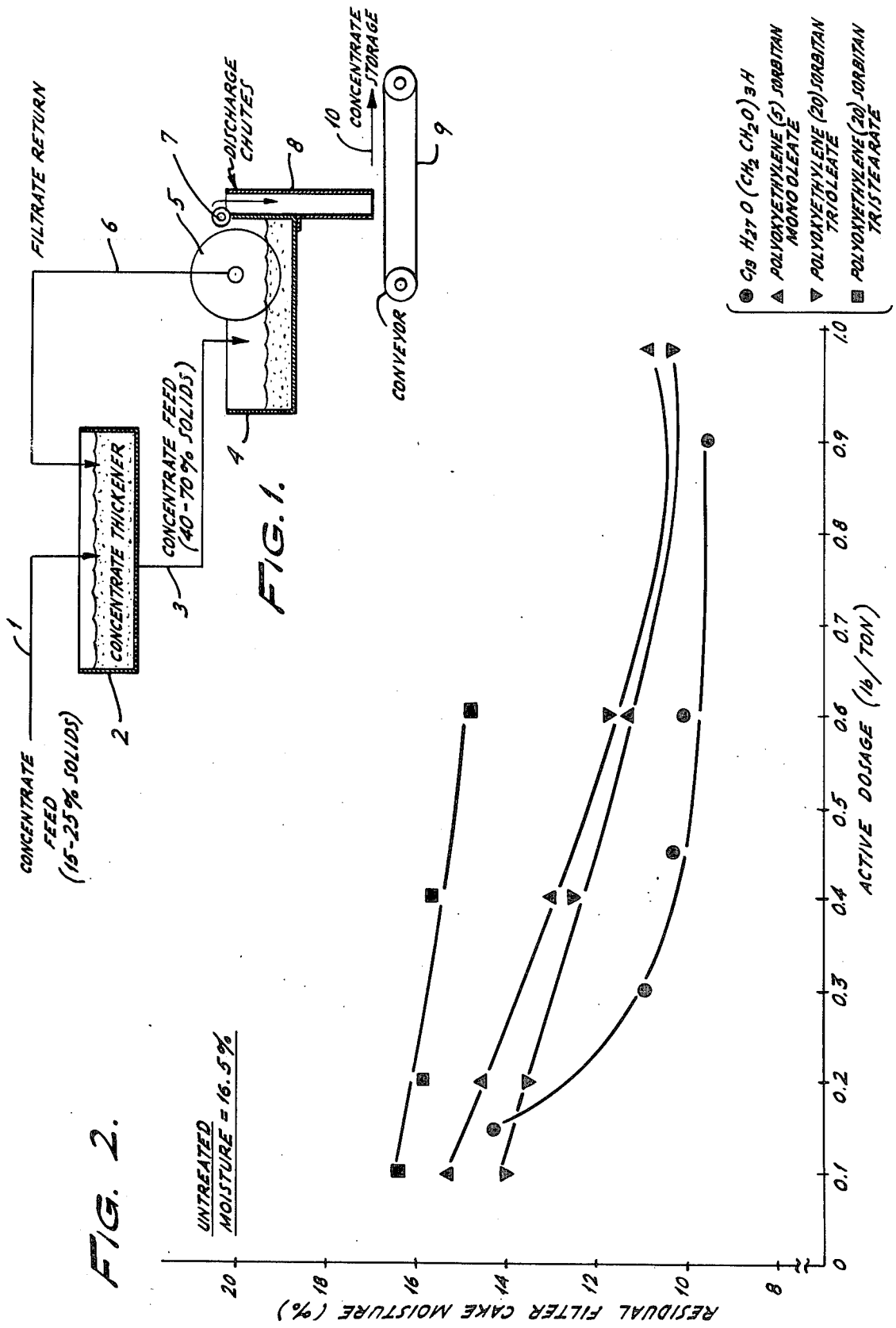

DEWATERING ORE CONCENTRATES WITH BRANCHED ALKYL ETHOXYLATED ALCOHOL

This is a division of co-pending application Ser. No. 813,573 filed on July 7, 1977.

BACKGROUND OF INVENTION

The metallurgical art in concentrating many mineral ores such as the metal sulfides, e.g., copper, lead, zinc, iron, molybdenum, nickel or combinations of these, and other mineral species, clay, coal, iron ore etc., has been confronted with the problem of dewatering ore concentrates obtained by conventional separation methods, in which the minerals are separated from the relatively worthless gangue by flotation in an aqueous medium. The resulting ore concentrates comprise a slurry or pulp, that is, a mixture of ore concentrates and water, which has included an undesirably great proportion of water. In the general art of mineral ore concentration this slurry or pulp is processed in a system comprising a thickener and either a rotary drum or leaf vacuum filter.

The slurry from the flotation process which contains thin solids, typically 15-25% by weight, is introduced to a thickener where the solids settle and become concentrated at the bottom. Flocculants are occasionally added to the slurry to facilitate this settling process. The thickener overflow consisting of a large volume of high quality water is returned to the mill water supply for further use. The thickened solids, typically 35-75% by weight, are then pumped to the filter where additional water is removed as a filter cake is built up upon the filter media. The filter cake is discharged as the product while the filtrate is returned to the thickener. However, in the filtration of ore concentrates without the use of filtration or drainage aid, the resulting filter cake is generally wet, plastic, sticky and difficult to handle.

In order to more fully describe the problem area to which the present invention is directed, a specific illustration of a particular operation might be helpful. Although a discussion of the operation and the problem specifically experienced in the copper recovery process follows, it should be understood that the similar problems are experienced in the concentration of any of the metal sulfides, lead, zinc, nickel, iron, molybdenum, combinations thereof or in the recovery of other mineral species, e.g., coal, clay, iron ore (iron oxide). A flow diagram of a typical filter plant is depicted by FIG. 1 of the drawings. The description following, together with the descriptive matter in the figure, makes further explanation thereof unnecessary.

Basically, the segment of the recovery process to which the present invention is directed is the filter plant. In standard copper mill applications, the copper concentrate which has been ground and floated away from the gangue materials is processed further through cleaner and recleaner flotation circuits. If a molybdenum (moly) recovery plant is not being used, the overflow from the recleaner circuit is pumped directly to the concentrate thickener. If a moly recovery plant is in use, the concentrate is processed further where the moly is floated and the copper is depressed and comes off as moly plant tailings which are then pumped to the concentrate thickener. In either case referring to FIG. 1, the stream containing the copper concentrate (1) arrives at the thickener (2) with a concentrate solids level of between 15-25%. The typical particle size of the solids expressed as percent which is retained on a 65 mesh screen when dry is 0%. Depending upon the individual plant operations, these solids are concentrated generally to a level between 40-70% and are then pumped through line (3) to one or more filters (5). There are a wide variety of filters in use in the industry; however, the more common units in use are rotary vacuum drum or disc filters.

The thickened concentrate slurry is contained in the filter tub (4). The system may be operated with an overflow or return to the thickener (6) so that the solids content in the circulating load may be controlled. When using a drainage aid to assist in the filtration operation, it is desirable to operate without an overflow so that all of the concentrate slurry entering the filter tub will be treated and none of the treated material will be returned to the thickener.

In the operation of the filter (5), the filter media (cloth) is immersed in the concentrate slurry for a period of 30-60 seconds under vacuum forming a cake. As the filter media (cloth) emerges from the surface of the concentrate slurry, the vacuum is continued so that the remaining moisture in the filter cake can be reduced to the lowest possible level. Time period for the drying cycle is typically between 40-70 seconds. The speed of most filters can be controlled so that cake formation and drying times can be adjusted to meet changing mill conditions. With the drum type filter, the filter media passes over a breaker bar (7) where the cake breaks up, falls vertically through chutes (8) onto a horizontal conveyor belt (9) and is taken to concentrate storage (10). In the disc type filter, the filter bags are generally expanded by air pressure to loosen the dried concentrate which either falls off, or if wet, is removed by scrapers. The vacuum in the filters is ideally maintained at 15-25" Hg; however, many of these plants, because of various reasons, run the vacuums in the range of only 10-12" Hg.

Those skilled in the art of filtration will recognize that there are a large number of variables which can effect the rate of filtration and there are many problems which are encountered in the operation of filter plants. The end result of the majority of these problems is usually a higher residual moisture level of the filter cake. It is not practical to attempt any sharp classifications concerning the relative significance of the residual moisture level to an individual mill operation, however, the following discussion of copper recovery operations will serve to illustrate some of the problems in handling wet filter cake at various residual moisture levels. In addition, high residual moisture imposes economic penalties in the form of shipping and drying costs which will become apparent in an ensuing section.

With a residual moisture level in the range of 17 to 23%, by weight, the filter cake is usually very thin, watery and will not discharge cleanly from the filter fabric. Further throughput of the filter can be seriously impaired at these moisture levels. A residual moisture level of between 14 to 17%, by weight, is fairly typical of many mills filtering copper ore concentrates. At this moisture level, the filter cake is still wet and sticky; however, it can be handled. A common problem encountered in mills operating within this moisture range lies in the stickiness of the wet filter cake. This property causes the cake to adhere to the filter fabric or conveyor belts where it eventually builds up. This build up of the abrasive concentrate is eventually forced into shaft or idler bearings seriously shortening their useful life. These problems require constant attention of Filter Operators or cleanup crews to assure that the automatic operation is continued with the least amount of interruption.

A residual moisture level between 11 to 14% in the discharged filter cake is a more common range encountered in the processing of copper ores. While still somewhat plastic, filter cake with this level of moisture can be handled on most plant filtration equipment. The most desirable range of residual moisture level in the discharged filter cake is between 8 to 11%. In this range, filter operational problems are minimized. The economic penalties associated with the shipping or drying of the wet filter cake are also minimized. With the present state of the art, it is impractical to reduce the moisture level of filter cake significantly below 8%, since the resulting losses from dusting during transportation or materials handling off-set the economic advantages of lower moisture levels.

When the filter cake moisture is above 14.0%, the cake is compressible and quite sticky. Filter cake with these moisture levels does not release cleanly from the surface of the fabric. On disc filters, the wet cake must be scraped off, which is only partly effective and seriously shortens the useful life of the filter bags. On both disc and drum filters, the material which sticks on the filter fabric and is not discharged returns to the filter tub and can increase the solids levels, particularly slimes, to an undesirably high level. With continued exposure to high vacuums in the filter cycle, the adhered material becomes embedded in the surface of the fabric, reducing its porosity and shortening its useful life.

Although attempts have been made to overcome the foregoing difficulties and numerous other operational problems in filter plants, none, as far as we are aware, prior to the instant invention, have been entirely successful, when carried into practice commercially on an industrial scale.

Stoneman et al, in U.S. Pat. No. 2,864,765, provides a very comprehensive description and discussion to the area to which the present invention is directed and teaches the use of a polyoxyethylene ether of a hexitol anhydride partial long chain fatty acid ester, functioning alone or as a solution in kerosene. While moderately effective in reducing the moisture levels of the resulting filter cake, these products are quite expensive in their own right and, in addition, require uneconomical feed rates to achieve the desired moisture levels. There are several additional deterents in reducing these teachings to practice on an industrial scale.

The compounds disclosed are essentially not adsorbed upon the solid surface of the ore particles and remain in the filtrate. As this filtrate is returned to the thickener, the concentration builds up over a period of time and several serious problems may result. With a number of ores these compounds can function as weak dispersants and seriously interfere with the basic operations of the thickener (which is to concentrate rather than disperse). An additional problem which results as the concentration of these compounds increases is that they are eventually discharged from the thickener overflow into the mill supply water where they may cause serious disruptions to the metallurgical recovery in the froth flotation circuits.

A second class of compounds, the sulfosuccinate esters, particularly di-2 ethyl hexyl sulfosuccinate, have also been used as dewatering aids in the filtration of mineral ore concentrates. While providing excellent performance as dewatering aids in some mills, these compounds are subject to similar problems indicated above in interfering with the thickener operations and disrupting metallurgical recovery in the flotation circuits. Those skilled in this art frequently resort to massive lime treatment of the thickener overflows in an attempt to hydrolyze the sulfosuccinate ester and prevent its interference in the flotation circuits. Published reports indicate this massive lime treatment is only partially successful. A further attendant difficulty with the use of the sulfosuccinate esters is their tendency to thin the filter cake which reduces the amount of concentrate solids picked up during each filtration cycle. This tendency can result in a marked decrease in the overall capacity of the filter plant.

In summary, the filter plant represents an important area of a copper mill. Because the total output of these mills normally passes through the filter plant any operational problems here can affect the total recovery process. With the tonnage which these mills generally process, this can represent a severe economic loss.

BRIEF DESCRIPTION OF THE DRAWINGS

FIG. 1 shows a flow diagram of a typical filter plant.
FIG. 2 shows a comparasion of various dewatering aids.

GENERAL DESCRIPTION OF INVENTION AND ITS OBJECTIVES

It has now been discovered that, in dewatering of ore concentrates, slurries or pulps, the handling characteristics of dewatered solids, such as filter cake, comprising ore concentrates can be greatly improved and the water content thereof significantly reduced by the addition of small percentages of special organic compounds to the slurry or pulp prior to filtering.

It is an object of the present invention to provide a method of dewatering ore concentrates in which the dewatered solids will retain no more than a desirably low percentage of water which are readily and easily handled by conventional methods of materials handling.

It is a further object of this invention to condition an ore concentrate by the addition of small amounts of special organic compounds to the slurry or pulp prior to dewatering and that these compounds remain with the ore particles enabling them to be handled at substantially lower moistures than has heretofore been possible.

It is a further object of this invention to reduce the moistures in the filter cake to a low level so that not only will a moderate amount of thermal energy be required to further dry the solids prior to roasting or smelting, but also transportation costs will be minimized because of the lower moisture content of the cake.

It is a further object of this invention to achieve these objectives through the use of compounds which are essentially adsorbed upon the surfaces of the particles whereby excess materials will not remain in the aqueous filtrate and thereby cannot interfere with the basic operations in either the thickener or flotation circuits.

Generally speaking, the present invention contemplates the improvement in the art of dewatering ore concentrate slurries or pulps of metal sulfides, e.g., copper, lead, zinc, iron, molybdenum, nickel, alone or in combination, or of other mineral species, iron ore, (taconite), clay, coal etc. which comprises incorporating in an ore concentrate slurry or pulp a small but effective amount of up to 1.0% by weight of the slurry or pulp solids of a dewatering agent comprising a linear or branched alkyl ethoxylated alcohol, then dewatering the thus-treated slurry or pulp, as by filtration, to remove a substantial proportion of the water from the slurry, to provide a friable, easily handled, relatively dry solids cake, and, in some cases, to improve the speed with which water may be removed from the solids.

The ore concentrate slurries or pulps which are treated according to the present invention comprise mixtures of ore concentrate and water: the concentrate solids comprising between 40% and 75% of the mixture by weight and the water comprising between 25% and 60% of the mixture by weight. The ore concentrates themselves comprise pulverized ore fractions from which a substantial portion of the relatively worthless gangue has been removed, as by flotation or other methods of mineral separation, so that the thus-treated concentrates are relatively rich in the minerals which it is desired ultimately to extract. The ore concentrates range in particle size up to a maximum of 48 mesh or 300 microns.

As earlier disclosed concentrates obtained from a variety of ores may be treated according to the present invention. Thus concentrates of copper sulfides such as chalcopyrite, chalcocite, covellite, bornite, molybdenite, sphalerite, etc., either alone or in combination, are particularly effectively treated in accordance with the present invention. Those skilled in the art will readily recognize that the practice of the invention could readily be applied to other mineral ore concentrates also earlier disclosed.

SPECIFIC DESCRIPTION OF THE INVENTION

The present inventors discovered that if a small, but effective amount of a dewatering aid having the formula $$R_2-\underset{\underset{R_3}{|}}{\overset{\overset{R_1}{|}}{C}}-O(CH_2CH_2O)_nH$$

wherein $R_1$, $R_2$ and $R_3$ are selected from the group consisting of hydrogen and alkyl such that the sum of the total number of carbon atoms in $R_1$, $R_2$ and $R_3$ is an average of from about 5 to 17 and preferably an average of about 9 to 14, and n is an average of about 1 to 7 and preferably an average of 2 to about 5, is added to the aqueous slurry of a wet metal sulfide or mineral ore concentrate solids prior to filtration thereof and then the ore concentrate filtered, a filter cake of the solids would be obtained which possesses low moisture content and has better handling and processing characteristics.

The dewatering aid is added to the aqueous slurry in an amount of from about 0.1 to about 1 pound per ton of ore concentrate solids contained in the aqueous slurry. The dewatering aid preferably should be added at a stage in the concentration operation prior to filtration which would insure optimum mixing of the aid throughout the aqueous slurry. This feature is clearly desirable since the aid is substantially water insoluble and is believed to function by adsorption on the particles to promote drainage. In normal plant or mill operation the aid can be added ahead of the filters, for example, to the suction side of the concentrate slurry pump or directly to the slurry discharge into the filter tub.

Because the dewatering aids are substantially water insoluble it is most desirable to formulate such with an effective amount of water soluble emulsifiers which promote mixing of the dewatering aid in the slurry thereby enhancing its activity. The combination of dewatering aid and emulsifier may be either with or without water. The combination may, for example, be shipped neat with water being added for dilution and ease of feed on site where addition is to occur. The amount of emulsifier used in the combination on a weight ratio of dewatering aid to emulsifier is about 20:1 to 1:1 and preferably 10:1 to 2:1. The combination is effective when added to the aqueous slurry of ore concentrate solids in an amount of 0.15 to 1.5 pounds per ton of ore concentrate solids contained in the slurry. The preferred emulsifiers are the anionic variety, with $C_4$ to $C_{18}$ sulfosuccinate or the $C_4$ to $C_{18}$ ethoxy sulfate being among those found to be quite effective. Sodium dioctyl sulfosuccinate and hexyl ethoxy sulfate were found to be most effective.

As indicated earlier, the most preferred formulation is that composed of the aid, an anionic emulsifier and water; however, it is also desirable to formulate the dewatering aid in a hydrocarbon solvent, e.g., light oils, kerosene, odorless kerosene, etc. The weight ratio of dewatering aid to hydrocarbon solvent is from about 3:2 to 1:4. This combination is effective when used in an amount of 0.15 to about 1.5 pounds per ton of ore concentrate in the slurry. The combination of the dewatering aid and hydrocarbon oil may, preferably, additionally contain emulsifiers described above as regards the aqueous formulations and in the amount specified for that formulation.

The dewatering aids of the invention are commercially available and are made by ethoxylation of a primary or secondary alcohol. As with many commercial products, the alcohols are in fact mixtures of $C_6$ to $C_{18}$, or in most instances $C_9$ to $C_{14}$ alcohols. Accordingly, with ethoxylation a mixed product is obtained. The same is true with the degree of ethoxylation. The ethoxylation reaction is not specific; accordingly, average numbers result as opposed to absolute values.

Typical formulas for the drainage aid include the following:

| Formula | Type Alcohol | Carbon Atoms in Alcohol Portion i.e. $R_1 + R_2 + R_3$ |
|---|---|---|
| 1. $CH_3(CH_2)_{11}CH_2-O(CH_2CH_2O)_{1.2}H$ | 1° (Primary) | $C_{13}$ |
| 2. $CH_3(CH_2)_9CH_2-O(CH_2CH_2O)_{2.5}H$ | 1° | $C_{11}$ |
| 3. $CH_3(CH_2\cdot)_{CH2}-O(CH_2CH_2O)_3H$ | 1° | $C_{14}$ |
| 4. $CH_3(CH_2)_4CH_2-O(CH_2CH_2O)_3H$ | 1° | $C_6$ |
| 5. $CH_3(CH_2)_9CH_2-O(CH_2CH_2O)_{5.7}H$ | 1° | $C_{11}$ |
| 6. $CH_3(CH_2)_{11}CH_2-O(CH_2CH_2O)_3H$ | 1° | $C_{13}$ |
| 7. $CH_3(CH_2)_{10}\underset{\underset{}{}}{\overset{\overset{CH_3}{|}}{CH}}-O(CH_2CH_2O)_3H$ | 2° (Secondary) | $C_{13}$ |

-continued

| Formula | Type Alcohol | Carbon Atoms in Alcohol Portion i.e. $R_1 + R_2 + R_3$ |
|---|---|---|
| 8. $CH_3(CH_2)_6\underset{\underset{CH_3}{\mid}}{CH}-O(CH_2CH_2O)_3H$ | 2° | $C_9$ |

In formulating the compounds for commercial usage it is desirable in aqueous formulations to include commonly used stabilizing agents to protect against cold temperatures and to enhance shelf-life. These stabilizers include methyl cellosolve, isopropyl alcohol and the like. These are included in an amount of 7 to 15% by weight of the formulation.

LABORATORY TEST PROCEDURE

The laboratory procedure and test equipment employed throughout the evaluation program is the same as used throughout the industry and is described specifically in Bulletin No. 251 LT, "Filtration Leaf Test Procedures," published by Dorr-Oliver Corporation, Stamford, Connecticut. The laboratory equipment utilized is described below. The filter leaf test assembly utilized was a standard 1/10 square foot test leaf obtained from Dorr-Oliver, Inc. All filtration variables were adjusted to conform with common mill operating conditions.

The filter fabric used in these tests was obtained from Eimco Envirotech Corporation, Salt Lake City, Utah. The physical specifications of this filter fabric are indicated in the following table:

| Filter Media | |
|---|---|
| Media No. | POPR-853F |
| Weave | 2/2 twill |
| Yarn | Multi-filament |
| Thread Count | 59 × 58 |
| Weight | 9.00 oz/yd$^2$ |
| Air Flow | 22.0 cfm/ft$^2$ |
| Finish | Heat-Set |

The vacuum source was provided by a Model 1400 Welsh Duo-Seal vacuum pump. The vacuum level, measured in inches of mercury was adjusted to conform to mill conditions. The drying sources used in this program were either a constant temperature (160° F.) air circulating oven or an infrared (250 W) drying lamp. Filter cakes were dried to constant weight.

It was experimentally determined through evaluating ore samples from a number of mills that a cake formation time of either 15 or 30 seconds would provide filter test cakes with thicknesses normally obtained on production filters. Filter cake drying time under vacuum was maintained at 60 seconds throughout these tests.

PROCEDURE

1. The equipment is assembled as indicated in the Dorr-Oliver Publication.
2. A fresh sample of copper concentrate slurry is placed in a standard mixer and, if necessary, the percent solids adjusted with mill water.
3. The vacuum hose is sealed and the vacuum in the system is adjusted to 20 inches of mercury by adjusting the air bleed valve.
4. The mixer containing the concentrate slurry is halted and a six liter sample is quickly poured into the slurry container. The mixer is then restarted.
5. The variable speed mixer is inserted into the container and the speed is adjusted to a rate which will keep the concentrate solids in suspension.
6. The laboratory timer which controls the operation of the vacuum pump is set for 1 minute 40 seconds (for 30 second cake formation time) and is started.
7. At 1 minute 30 seconds, the filter test leaf is immersed into the concentrate slurry until the bushing is just covered, a distance of approximately 2 inches.
8. A cake formation time of 30 seconds is provided. At a time of 1 minute on the timer, the filter test leaf is rotated out of the concentrate slurry and is hung upon the drying platform.
9. A drying time of 1 minute is provided, at which point the timer automatically turns off the vacuum pump.
10. The filter test leaf is removed from the vacuum base and a thin blade spatula is used to loosen the edge of the filter cake on the inside of the compression ring. The filter cake can then be transferred to a paper towel by gently blowing into the hose adapter. Any filter cake which adhered to the filter cloth is removed with a spatula.
11. The filter leaf assembly is washed with tap water, using a stiff bristled brush, if necessary, to remove any adherent material.
12. The wet filter cake and paper towel are weighed to the nearest 0.1 gm on a balance which has been tared for the weight of the paper towel. The wet weight of the filter cake is recorded as Ww.
13. The wet filter cake is then transferred to the drying apparatus and sufficient time is provided to dry the cake to constant weight.
14. The dry filter cake is then weighed upon a balance which has been tared for the dry weight of the paper towel. The dry weight is recorded as Wd.
15. Percent moisture in the filter cake is calculated using the following formula:

$Ww - Wd/Ww \times 100 = \%$ moisture

16. Filter leaf tests are run in duplicate or triplicate and the results of determinations averaged.
17. The concentrate slurry sample is then treated with the appropriate amount of the filter aid under test, stirred to insure the necessary mixing into the concentrate slurry and steps 5 through 16 are repeated.

LABORATORY STUDIES CONDUCTED

In order to perform the various evaluations and comparisons which are explained more fully below a large sample of a slurry of a copper sulfide concentrate was obtained from a mill in Arizona. The slurry, used throughout the following tests, had the following composition and physical characteristics: the slurry was composed primarily of chalcopyrite, with minor amounts of chalcocite and covellite and had the following particle size distribution.

| Size | Percent Retained (%) | Cumulative Percent Retained (%) |
|---|---|---|
| Micro-Sieve Analysis | | |
| + 30 microns | 18.75 | 18.75 |
| + 25 microns | 6.85 | 25.6 |
| + 20 microns | 12.0 | 37.6 |
| + 15 microns | 23.05 | 60.65 |
| − 15 microns | 39.35 | 100.0 |
| Standard Sieve Analysis | | |
| + 100 mesh | Trace | Trace |
| + 200 mesh | 0.9 | 0.9 |
| + 325 mesh | 19.7 | 20.6 |
| + 400 mesh | 8.2 | 28.8 |
| − 400 mesh | 69.4 | 100.0 |

The first series of tests conducted were designed to establish the effectiveness of the compounds claimed.

The compounds were fed as a 60% solution in water. However, the feed rates as listed in the following Table I were based upon active ingredients, i.e., when for example "0.3 lb/ton" is set forth, the feed is actually 0.3 lb/ton of the dewatering aid not including the water. The foregoing is true for all of the tests conducted where the dewatering aid is formulated with emulsifiers and/or hydrocarbon oil - the active ingredients and the pounds fed are based upon the weight of each in the respective formulations.

The first series of tests conducted established the efficacy of the dewatering aids where total carbon atoms in alcohol portion and "n" were varied. As earlier stated, these are average numbers and accordingly are set forth as such in the Table. Table I also records the results of the test establishing that the alkyl group can be either straight chain or branched. Both were found to be quite effective.

The results as recorded in Table I established quite conclusively that the compounds of the invention were effective for the purpose. In addition, the filter cakes obtained all had good handling characteristics, i.e., were not sticky or plastic and appeared to be quite satisfactory from subsequent handling and processing standpoints.

In order to compare the efficacy of the present compounds with compounds previously being used for the purpose, comparative tests were conducted using materials which are encompassed by the Stoneman patent earlier referred to, and sodium dioctyl sulfosuccinate which is commonly found in various mills as a filtration aid. The results of this comparison are recorded in Table II. The results have also been expressed in graph form as FIG. 2. Again, treatments are based upon active ingredient, although for ease of addition each compound was diluted with water.

TABLE II

Untreated Copper Ore Concentrate = Filter Cake Contained 16.5% Residual Moisture
Residual Filter Cake Moisture Vs. Active Feed Rate

| COMPOUND TESTED | | | | | |
|---|---|---|---|---|---|
| 1. $C_{13}H_{27}O(CH_2CH_2O)_3H$ | (0.15 lb./Ton) | (0.3 lb./Ton) | (0.45 lb./Ton) | (0.6 lb./Ton) | (0.9 lb./Ton) |
| | 14.5 | 11.0 | 10.4 | 10.2 | 9.6 |
| 2. Polyoxyethylene sorbitan monooleate (Moles of Ethoxylation = 5) | (0.1 lb./Ton) | (0.2 lb./Ton) | (0.4 lb./Ton) | (0.6 lb./Ton) | (1.0 lb./Ton) |
| | 15.3 | 14.6 | 13.0 | 11.3 | 10.9 |
| 3. Polyoxyethylene sorbitan trioleate (Moles of Ethoxylation = 20) | 14.1 | 13.6 | 12.6 | 11.8 | 10.4 |
| 4. Polyoxyethylene sorbitan tristearate (Moles of Ethoxylation = 20) | 16.4 | 15.9 | 15.7 | 14.8 | — |
| 5. Sodium Dioctyl sulfosuccinate | — | 15.6 | 14.0 | 12.1 | 10.8 |

The test results established that the present compounds, when compared with those of the prior art or those being used, were quite effective and in most instances were significantly better for the purpose.

A further comparison was conducted to establish what feedrate was required to obtain a filter cake having a residual moisture of 10.4%. The results are recorded in Table IIA.

TABLE IIA

| Compound Tested | Feed Rate Required to Produce Filter Cake With 10.4% Residual Moisture |
|---|---|
| 1. $C_{13}H_{27}O(CH_2CH_2O)_3H$ | 0.45 lb/ton |
| 2. Polyoxyethylene sorbitan monooleate (moles of ethoxylation = 5) | 1.0 lb/ton |
| 3. Polyoxyethylene sorbitan trioleate (moles of ethyoxylation = 20) | 1.0 lb/ton |

TABLE I

Compound used in Examples: 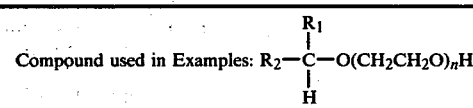

Untreated Copper Ore Concentrate = Filter Cake Contained 15% Residual Moisture
Percentage of Residual Filter Cake Moisture Vs. Feed Rate

| TREATMENT | $R_1 = H$ $R_2 = C_mH_{2m+1}$ | n | 0.15 lb./Ton | 0.3 lb./Ton | 0.45 lb./Ton | 0.6 lb./Ton | 0.9 lb./Ton |
|---|---|---|---|---|---|---|---|
| Example 1 | 11.0 | 1.2 | — | 11.5 | — | 10.5 | 9.9 |
| Example 2 | 8.0 | 2.5 | — | 11.7 | — | 9.9 | 9.0 |
| Example 3 | 10.0 | 3.0 | — | 12.0 | — | 8.9 | 8.0 |
| Example 4 | 8.0 | 5.7 | — | 12.0 | — | 10.6 | 9.4 |
| Example 5 | 10.0 | 7.0 | — | 13.0 | — | 11.3 | 10.5 |
| Example 6 (Linear Alkyl) | 12.0 | 3.0 | 12.0 | 10.4 | 9.5 | 9.1 | — |
| Example 7* (Branched) | 12.0 | 3.0 | 11.4 | 9.5 | 9.1 | 8.8 | — |

*$R_1 + R_2 = 12$ Carbon Atoms.

TABLE IIA-continued

| Compound Tested | Feed Rate Required to Produce Filter Cake With 10.4% Residual Moisture |
|---|---|
| 4. Polyoxyethylene sorbitan tristearate (moles of ethyoxylation = 20) | 1.0 lb/ton |
| 5. Sodium Dioctyl Sulfosuccinate | 1.0 lb/ton |

From the above data, it is obvious that the amount of the compound of the present invention required to produce a filter cake having a desired residual moisture content was substantially less on an active to active basis.

The following tests were conducted to establish the desirability of formulating the compounds of the present invention with anionic emulsifiers. The formulations on a weight basis for the respective products are as follows.

EXAMPLE 8

Product 8 was produced by blending the following:
80%: $C_{13}H_{27}O(CH_2CH_2O)_3H$
20%: Water.

EXAMPLE 9

Product 9 was produced by blending the following:
55%: compound of Example 6 (Table I)
5%: Sodium dioctyl sulfosuccinate
40%: water.

EXAMPLE 10

Product 10 was produced by blending the following:
80%: Compound of Example 6
10%: Sodium dioctyl sulfosuccinate
10%: Water.

EXAMPLE 11

Product 11 was produced by blending the following:
40%: Compound of Example 6
20%: Sodium dioctyl sulfosuccinate
40%: Water.

The results of the testing are reported in Table III.

TABLE III

Untreated Copper Ore Concentrate = Filter Cake with 19% Residual Moisture

| | % Residual Filter Cake Moisture vs. Active Feed Rate | | |
|---|---|---|---|
| | 0.3 lb/ton | 0.6 lb/ton | 0.9 lb/ton |
| Product 8 | 15.3 | 13.6 | 12.3 |
| Product 9 | 15.4 | 12.4 | 10.8 |
| Product 10 | 15.1 | 12.3 | 10.7 |
| Product 11 | 14.5 | 12.0 | 10.6 |

The above results establish quite conclusively the significance of including the emulsifier.

Further comparisons were made to establish the desirablity of including the emulsifier. Other products were formulated which contained different emulsifiers. They were as follows:

EXAMPLE 12

Product 12 was produced by blending the following:
55%: Compound of Example 6
5%: $C_{13}$ Ethoxy Sulfate (Ammonium Salt)
40%: Water

EXAMPLE 13

Product 13 was produced by blending the following:
55%: Compound of Example 6
5%: $C_{13}$ Ethoxy sulfate (Sodium Salt)
40%: Water

EXAMPLE 14

Product 14 was produced by blending the following:
55%: Compound of Example 6
5%: Sodium di-tridecyl sulfosuccinate
40%: Water The results of the testing are recorded in Table III A following:

TABLE III A

Untreated Copper Ore Concentrate = Filter Cake Contained 17% Residual Moisture

| | Residual Filter Cake Moisture vs. Active Feedrate | | |
|---|---|---|---|
| Product Tested | 0.3 lb/ton | 0.6 lb/ton | 0.9 lb/ton |
| Product 8 | 15.3 | 13.6 | 12.3 |
| Product 9 | 14.0 | 11.5 | 11.0 |
| Product 12 | 14.6 | 12.0 | 10.9 |
| Product 13 | 14.2 | 11.8 | 11.0 |
| Product 14 | 14.4 | 12.2 | 11.4 |

The additional tests as recorded in Table III A established the desirability of including the emulsifiers in the formulation.

The following products were tested to establish the efficacy of formulations containing light hydrocarbon oils in combination with the compounds of the invention. For these tests a sample of copper sulfide slurry was obtained from a source different from that used for the preceding tests. The copper sulfide in the concentrate was composed primarily of chalcopyrite with minor amounts of chalcocite, covellite and bornite. The particle size distribution of the ore concentrate was as follows:

| | Micro-Sieve Analysis | |
|---|---|---|
| Test Number Micron | Moisture % Retained | Average Cuml. % |
| 30 | 40.5 | 40.5 |
| 25 | 7.3 | 47.8 |
| 20 | 8.5 | 56.3 |
| 15 | 12.2 | 68.5 |
| −15 | 31.5 | 100.0 |

The slurry sample also contained a portion of a flocculant polymer normally used in the concentrate thickener.

EXAMPLE 15

Product 15 was produced by blending the following ingredients on a weight basis. This product is the product used in the field trials described later in the application.

| | | $R_1 = H$ |
|---|---|---|
| | | $R_2 = C_{13}H_{27}$ |
| 55.0% | $C_{13}H_{27}O(CH_2CH_2O)_3H$ | $R_3 = H$ |
| 5.0% | Sodium dioctyl sulfosuccinate | |
| 7.5% | Isopropanol | |
| 7.5% | Methyl cellosolve | |
| 25.0% | Water | |

EXAMPLES 16 THROUGH 21

Products 16 through 21 were produced by blending the following ingredients. The different hydrocarbon liquids utilized are listed following, together with a short description thereof.

55%:$C_{13}H_{27}O(CH_2CH_2O)H$
5%:Sodium dioctyl sulfosuccinate
40%:Hydrocarbon The hydrocarbons used were
  Product 16:Odorless kerosene
  Product 17:Kerosene
  Product 18:Light paraffin oil
  Product 19:Naphthenic process oil (mol. wt. 55)
  Product 20:Naphthenic process oil (mol. wt. 300)
  Product 21:Heavy aromatic naphtha The results of the testing are recorded in Table IV with the numbers under the product designations representing the percentage of residual moisture in the filter cake similar to the previous tables. The untreated copper slurry resulted in a filter cake having a residual moisture content of 15.9%.

TABLE IV

| | ← PRODUCT OF EXAMPLE → | | | | | | |
|---|---|---|---|---|---|---|---|
| | 15 | 16 | 17 | 18 | 19 | 20 | 21 |
| FEEDRATE | RESIDUAL MOISTURE LEVELS (%) | | | | | | |
| 0.125 lb./Ton | 11.6 | 11.9 | 12.3 | 12.2 | 14.4 | 12.6 | 13.3 |
| 0.250 lb./Ton | 10.1 | 10.4 | 11.2 | 11.7 | 12.2 | 11.4 | 11.8 |
| 0.500 lb./Ton | 9.2 | 9.7 | 10.0 | 9.9 | 10.4 | 10.8 | 10.7 |
| 0.750 lb./Ton | 9.2 | 9.5 | 9.8 | 9.4 | 10.0 | 9.4 | 10.6 |

MILL TRIALS

A copper recovery plant having an operation depicted by the flow diagram of FIG. 1 was having difficulty achieving filter cakes of low moisture content using multiple disc filters and therefore was experiencing the attendant handling, sticking and equipment malfunction problems. The mill at that point in time was treating the copper concentrate (55% solids) prior to filtration with 0.05 lbs. per ton of a sulfosuccinate drainage aid. The moisture in the cake was averaging between 15–16%. The cake was wet and sticky and created many of the problems earlier described under the "Background of the Invention."

The subject plant is equipped with a smelter and in their normal operations the wet filter cake is dried in two gas fired rotary kilns before it is stored in the smelter bins. It was desirable for the plant to reduce the moisture of the filter cake to a level of about 7.5 to 8% before being placed in the smelter storage bins. If the moisture was below this level, severe dust problems would be encountered. Above this level, the filter cake is sticky enough that it creates serious handling problems in the smelter storage bins. It is a fairly common occurrence to have one of these kiln driers break down. When this situation developed, the remaining drier did not have sufficient capacity to provide the necessary drying for the wet filter cake. If the moisture of the filter cake exceeds 10 to 11%, the mill must stack it on the ground and wait until it dries sufficiently to be placed in the storage bins. This practice obviously represents a serious materials handling problem.

The plant reported that they had experimentally evaluated a wide variety of prospective drainage aids over a period of many years without achieving any significant success, but agreed to a trial utilizing the Product of Example 15. It was established that the most outstanding feature of the use of the composition of the present invention was a greater flexibility and will be employed more fully in the plant operations which was not available previously.

This plant treated their concentrate slurry with the Product of Example 15 at a level of 0.5#/T. This provided it with a moisture in their filter cake of about 11%. When a higher feedrate (about 1.0#/T) was used, moisture levels of between 9 to 9.5% can be achieved. These results provided the plant with enough flexibility so that if a drier is lost they have only to increase the feedrate of the composition to achieve sufficient dryness to continue to send the filter cake to smelter storage rather than dump it on the ground. This situation has occurred several times since the plant began using the present composition.

ADVANTAGES PROVIDED BY PRESENT INVENTION

The inventors were able to develop information concerning the economic advantages of using effective drainage aids such as that of the present invention, in several areas. These include costs for moisture reduction either at the filter plant drier or in the reverberatory furnaces, or in the transportation of concentrate from a concentrator to a smelter.

In copper recovery operations, where the concentrator is not directly associated with a smelter, the recovered concentrate is normally shipped in rail hopper cars to a smelter for custom processing. With copper concentrate, the shipping costs from the concentrator to the smelter usually range between $4.00–10.00 per ton. Concentrators are paid on the basis of the amount of dried concentrate arriving at the smelter and shipping excess moisture represents an economic penalty since each pound of excess moisture means that a pound of copper concentrate cannot be shipped in that hopper car.

The fuel costs necessary to dry the filter cake prior to smelting also represent a significant economic factor in handling copper concentrate. There are a number of copper concentrators which also have smelters. These smelters handle their own ore and do custom smelting for other concentrators. In those mills with smelters, the wet filter cake being discharged from the filters is dried in gas or oil fired kilns to a level of about 8.0% before being transported to the smelter by conveyor. With the obviously increasing costs of energy this represents a serious economic penalty for high moisture levels in the nonconcentrate filter cake.

It appears that the ethoxylated alcohols function by adsorption on the particle surface and further that essentially all of the material fed is adsorbed. As a result, little, if any, of the product fed returns to the thickener with the filtrate where it could end up in the overflow back to the mill water supply and possibly interfere in the flotation process. In contrast, the product previously being used, a sulfosuccinate, does return with the filtrate and does enter the mill water supply. At least one mill resorted to massive lime treatment in an attempt to eliminate the product residue. It has not been ascertained what this represents in terms of costs; however, it is not very effective, since the plant reported continued interferences in their flotation circuits.

In a further field trail the Product of Example 15 was evaluated as a filtration aid in a mill concentrating an ore containing a mixture of the sulfides of zinc, lead and copper. This mill separated the sulfides of these metals through the selective flotation-depression mechanisms commonly used in the industry and final concentrates of each metal sulfide were stored in individual thickeners. Each of these thickeners was in a circuit with an associated disc filter to provide the final processing to dried filter cake of the metal sulfide concentrate.

This mill was feeding a drainage aid of unknown composition without achieving any significant success. They were not only experiencing operational problems with their filters but also were experiencing a serious economic penalty because of the costs of shipping filter cake with high levels of residual moisture. With the long distances involved in shipping their concentrates for custom smelting, the shipping costs per ton of concentrate were averaging about $40.00 per ton.

The operational problems being experienced by this mill were essentially similar to those cited in the earlier mill trial and the application of the Product of Example 15 provided essentially the same improvement in performances in the operation cited previously when applied individually to the zinc, lead and copper filters.

The most outstanding benefit in the application of the Product of Example 15 was in the reduction in the residual moisture levels of the filter cake being discharged. In the operation of the filter processing the zinc sulfide (sphalerite), the mill had been achieving residual moisture levels in the range of between 12 to 13.5% in the filter cake. Treating the concentrate slurry entering the filter tub with the Product of Example 15 at a feed rate of 0.50–0.75 pounds per ton reduced this residual moisture level in the filter cake being discharged to between 8 to 8.5%. This reduction in moisture represents a significant saving in shipping costs to this mill.

In the application of the Product of Example 15 for the treatment of the lead sulfide (galena) concentrate similar results were achieved during this mill trial. In their previous practice, the mill had been feeding a drainage aid of unknown composition and achieving residual moisture levels in the range of 11 to 12% in the filter cake being discharged from the lead concentrate filter. Through the application of the product of this invention, at a feedrate of 0.5 pounds per ton the inventors were able to reduce this residual moisture level in the filter cake to 6 to 7%. A significant improvement in the operation of the lead filter was also noted. Similar results were achieved in the application of this product to the copper concentrate filter where the residual moisture was reduced from its previous level of 10.5 to 11% to about 8%.

We claim:

1. A process for improving the dewatering of an aqueous slurry of an ore concentrate solids which will subsequently undergo filtration to provide a filter cake of the ore solids having a low moisture content and better handling and processing characteristics, which process comprises adding to said slurry prior to filtration an effective amount for the purpose of a dewatering aid having the formula

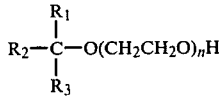

wherein $R_1$, $R_2$ and $R_3$ are selected from the group consisting of hydrogen and alkyl such that the sum of the total number of carbon atoms in $R_1$, $R_2$ and $R_3$ is an average of from about 5 to 17 and n is an average of about 1 to 7; subjecting the slurry to filtration; and thereby obtaining a filter cake having the said characteristics.

2. A process according to claim 1, wherein the dewatering aid is added to the aqueous slurry in an amount of from about 0.1 to about 1 pound per ton of ore concentrate solids contained in said slurry.

3. A process according to claim 1, wherein n is an average of from about 2 to about 4, and the total number of carbon atoms in $R_1$, $R_2$ and $R_3$ is 9 to 14, and n is an average of 2 to about 5.

4. A process according to claim 3, wherein the dewatering aid is added to the aqueous slurry in an amount of from about 0.1 to about 1 pound per ton of ore concentrate solids contained in said slurry.

5. A process according to claim 1, wherein the ore concentrate solids is a wet metal sulfide selected from the group consisting of (i) copper, lead, zinc, iron, molybdenum, and nickel sulfides either alone or in combination or (ii) a mineral species selected from the group consisting of clay, coal and iron ores.

6. A process according to claim 5, wherein the dewatering aid is added to the aqueous slurry in an amount of from about 0.1 to about 1 pound per ton of ore concentrate solids contained in said slurry.

7. A process according to claim 6, wherein n is an average of from about 2 to about 4, and wherein the total number of carbon atoms in $R_1$, $R_2$ and $R_3$ is 9 to 14, and n is an average of 2 to about 5.

8. A process according to claim 6, wherein the dewatering aid has the formula $C_{13}H_{27}O(CH_2CH_2O)_3H$.

9. A method according to claim 7, wherein the wet metal sulfide is a copper sulfide.

10. A method according to claim 7, wherein the wet metal sulfide is a lead sulfide.

11. A method according to claim 7, wherein the wet metal sulfide is a zinc sulfide.

12. A method according to claim 7, wherein the wet metal sulfide is a molybdenum sulfide.

13. A process for improving the dewatering of an aqueous slurry of an ore concentrate solids which will subsequently undergo filtration to provide a filter cake of the ore solids having a low moisture content and better handling and processing characteristics, which process comprises adding to said slurry prior to filtration an effective amount for the purpose of a composition comprising water; a dewatering aid having the formula

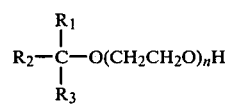

wherein $R_1$, $R_2$ and $R_3$ are selected from the group consisting of hydrogen and alkyl such that the sum of the total number of carbon atoms in $R_1$, $R_2$ and $R_3$ is an average of from about 5 to 17, and n is an average of about 1 to 7; and an effective amount for the purpose of a water soluble emulsifier which will promote the dispersiblity of the dewatering aid in the slurry and enhance its activity.

14. A process according to claim 13, wherein n is an average of from about 2 to 4 and wherein the total number of carbon atoms in $R_1$, $R_2$ and $R_3$ is 9 to 14, and n is an average of 2 to about 5.

15. A process according to claim 14, wherein the weight ratio of said dewatering aid to said emulsifier is from about 20:1 to 1:1.

16. A process according to claim 15, wherein the composition is added to the aqueous slurry in an amount of from about 0.15 to about 1.5 pounds per ton of ore concentrate solids contained in said slurry.

17. A process according to claim 16, wherein the emulsifier is an anionic $C_4$ to $C_{18}$ sulfosuccinate or a $C_4$ to $C_{18}$ ethoxy sulfate.

18. A process according to claim 13, wherein the ore concentrate solids is a wet metal sulfide selected from the group consisting of (i) copper, lead, zinc, iron, molybdenum and nickel sulfides either alone or in combination or (ii) a mineral species selected from the group consisting of clay, coal and iron ores.

19. A process according to claim 18, wherein n is an average of from about 2 to about 4 and wherein the total number of carbon atoms in $R_1$, $R_2$ and $R_3$ is 9 to 14, and n is an average of 2 to about 5.

20. A process according to claim 19, wherein the weight ratio of said dewatering aid to said emulsifier is from about 20:1 to 1:1.

21. A process according to claim 19, wherein the dewatering aid has the formula $C_{13}H_{27}O(CH_2CH_2O)_3H$.

22. A process according to claim 21, wherein the emulsifier is an anionic $C_4$ to $C_{18}$ sulfosuccinate or a $C_4$ to $C_{18}$ ethoxy sulfate and said composition is added to the aqueous slurry in an amount of from about 0.15 to about 1.5 pounds per ton of ore concentrate solids contained in said slurry.

23. A process according to claim 19, wherein the composition comprises on a weight basis about 55% of said dewatering aid, about 5% sodium dioctyl sulfosuccinate, about 15% cold temperature and shelf life stabilizing agents, and the remainder water.

24. A process for improving the dewatering of an aqueous slurry of an ore concentrate solids which will subsequently undergo filtration to provide a filter cake of the ore solids having a low moisture content and better handling and processing characteristics, which process comprises adding to said slurry prior to filtration an effective amount for the purpose of a composition comprising a dewatering aid having the formula

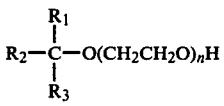

wherein $R_1$, $R_2$ and $R_3$ are selected from the group consisting of hydrogen and alkyl such that the sum of the total number of carbon atoms in $R_1$, $R_2$ and $R_3$ is an average of from about 5 to 17, and n is an average of about 1 to 7, in the liquid hydrocarbon solvent; subjecting the slurry to filtration; and thereby obtaining a filter cake having the said characteristics.

25. A process according to claim 24, wherein the composition is added to the aqueous slurry in an amount of from about 0.15 to about 1.5 pounds per ton of ore concentrate solids contained in said slurry.

26. A process according to claim 25, wherein the weight ratio of said aid to said hydrocarbon solvent is from about 3:2 to 1:4.

27. A process according to claim 26, wherein n is an average of from about 2 to about 4 and wherein the total carbon atoms of $R_1$, $R_2$ and $R_3$ is 9 to 14, and n is an average of 2 to about 5.

28. A process according to claim 24, wherein the ore concentrate solids are a wet metal sulfide selected from the group consisting of (i) copper, lead, zinc, iron, molybdenum and nickel sulfide either alone or in combination or (ii) a mineral species selected from the group consisting of clay, coal and iron ores.

29. A process according to claim 28, wherein n is an average of from about 2 to about 4 and wherein the total number of carbon atoms in $R_1$, $R_2$ and $R_3$ is 9 to 14, and n is an average of 2 to about 5.

30. A process according to claim 29, wherein the weight ratio of said aid to said hydrocarbon solvent is from about 3:2 to 1:4.

31. A process according to claim 30, wherein the dewatering aid has the formula $C_{13}H_{27}O(CH_2CH_2O)_3H$.

32. A process according to claim 31, wherein the composition further contains a water soluble emulsifier which will promote distribution of the aid in the slurry.

33. A process according to claim 32, wherein the hydrocarbon solvent is kerosene or an odorless kerosene and the emulsifier is an anionic sodium sulfosuccinate or a $C_4$ to $C_{18}$ ethoxy sulfate.

34. A method according to claim 33, wherein the composition comprises on a weight basis about 55% of said aid, about 5% sodium dioctyl sulfosuccinate and about 40% kerosene.

* * * * *

UNITED STATES PATENT OFFICE
CERTIFICATE OF CORRECTION

Patent No. 4,156,649      Dated May 29, 1979

Inventor(s) John F. Quinn et al

It is certified that error appears in the above-identified patent and that said Letters Patent are hereby corrected as shown below:

Formula 3 of the Table in Column 6 should read:

$$CH_3(CH_2)_{12} CH_2 - O(CH_2CH_2O)_3H$$

Column 11, line 24, the formula should read:

$$C_{13}H_{27} O(CH_2CH_2O)_3H$$

Signed and Sealed this

Sixteenth Day of October 1979

[SEAL]

*Attest:*

RUTH C. MASON
*Attesting Officer*

LUTRELLE F. PARKER
*Acting Commissioner of Patents and Trademarks*